(12) United States Patent
Liu et al.

(10) Patent No.: US 7,987,476 B2
(45) Date of Patent: Jul. 26, 2011

(54) APPARATUS FOR CLAMPING LARGE AND SMALL DISKS

(75) Inventors: Chin-Sung Liu, Hsinchu (TW);
Chia-Hao Ou, Hsinchu (TW);
Chun-Yao Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 513 days.

(21) Appl. No.: 12/186,519

(22) Filed: Aug. 6, 2008

(65) Prior Publication Data

US 2009/0077576 A1 Mar. 19, 2009

(30) Foreign Application Priority Data

Sep. 17, 2007 (TW) .............................. 96215640 U

(51) Int. Cl.
*G11B 17/028* (2006.01)

(52) U.S. Cl. ....................................... 720/711; 720/624

(58) Field of Classification Search .................. 720/706, 720/711, 617, 619–624
See application file for complete search history.

(56) References Cited

U.S. PATENT DOCUMENTS

| 5,022,023 A * | 6/1991 | Toyoguchi | 720/624 |
| 6,535,476 B1 * | 3/2003 | Haga | 720/706 |
| 6,964,058 B2 * | 11/2005 | Fujimura | 720/714 |
| 7,069,804 B2 * | 7/2006 | Kuo | 74/437 |
| 7,650,613 B2 * | 1/2010 | Hoshino | 720/624 |
| 2003/0161242 A1 * | 8/2003 | Shin | 369/77.1 |
| 2007/0277186 A1 * | 11/2007 | Yamada et al. | 720/622 |

* cited by examiner

*Primary Examiner* — Brian E Miller

(57) ABSTRACT

An apparatus for clamping both large and small disks is provided, including a disk tray inside a base, an upper case and two clamping mechanisms above the disk tray and the base. Each clamping mechanism includes a slider and a gripper structure. The gripper structure further includes a first gripper, a second gripper, and a resilient element located between the first and the second grippers. The second gripper includes a first belt-ring and a second belt-ring. When the disk is loaded, under the force of the resilient element, the first belt-ring and the second belt-ring hold the disk onto the disk tray firmly. When the first gripper moves to a specific position of the groove on the upper case, the first gripper causes the second gripper to rotate so that the resilient element stops to exert the force. Hence, the first belt-ring and the second belt-ring rotate upwards so as to complete the loading process. On the other hand, to eject a disk, the resilient element re-exerts force on the first gripper to cause the first belt-ring and the second belt-ring to rotate downwards to hold the disk until the disk is completely ejected to complete the ejecting process.

6 Claims, 9 Drawing Sheets

APPARATUS FOR CLAMPING LARGE AND SMALL DISKS

FIELD OF THE INVENTION

The present invention generally relates to an apparatus for clamping disks, and more specifically to a disk clamping apparatus for preventing the disks from slipping off during loading and ejecting process, applicable to both large disks (12 cm) and small disks (8 cm).

BACKGROUND OF THE INVENTION

The compact disks (CD) are capable of storing a large amount of data and small in size for storage and portability, and the disks are widely used for storing audiovisual data. Because of the popularity of disks, the disk players are also used in many venues for showing the contents of the disks. The quality of the show depends on the stability of the disk players.

To improve the stability of the disk players, a conventional approach is to utilize complex mechanic design. At present, the clamping mechanisms used by disk players use either a single bar or dual-stripes. The former design is stable, but complex and expensive. The latter design, while simple and inexpensive, is less stable.

It is imperative to devise a mechanism that is simple and inexpensive while maintaining high stability and quality for mass production to be profitable for the disk players.

SUMMARY OF THE INVENTION

The primary object of the present invention is to provide an apparatus for clamping disks that is applicable for both large and small disks, simple in design and inexpensive to manufacture.

Another object of the present invention is to provide an apparatus for clamping disks that can improve the stability and reliability during the loading and ejecting process.

To achieve the above objects, the present invention provides an apparatus for clamping large and small disks, including a base, a disk tray, an upper case, and two clamping mechanisms. The disk tray is located inside the base, and can move back and forth in the base. On the top of the disk tray are the clamping mechanisms and the upper case. The clamping mechanisms are located on both sides of the upper case. A single clamping mechanism includes a slider, and a clamping plate. The clamping plate further includes a resilient element, a first disk gripper, a second disk gripper, a first belt-ring and a second belt-ring.

The two sides of the upper part of the disk tray include two latches, located on the mortise of the slider for latch and release. One end of the slider includes a gripper structure located on the sliding tack of the upper case. The first disk gripper of the gripper structure is located in the grove of the upper case, and the groove is parallel to the sliding track so that the slider and the first disk gripper move back and forth along the sliding track and the groove separately.

In the initial state of the clamping mechanism, the first and the second belt-rings of the gripper structure are under the force of a resilient element to touch the top of the disk rack located at the front end of the disk tray. When the disk is placed between the first and the second belt-rings and the disk rack, the first and the second belt-rings exert force to provide a stable and reliable support to the disk. With the different gap designs for the first and the second belt-rings, the clamping mechanism is applicable to the support of both large and small disks. Furthermore, the belt-rings have a cylinder and rotatable design, which is suitable for supporting disks and can avoid damaging the disks or being damaged by the disks.

When the disk is loaded, the disk tray starts to move the slider and the gripper structure towards inside of the base. When the first disk gripper reaches the end of the groove, the first disk gripper will rotate upwards along the end of the groove, which causes the second disk gripper to rotate upwards in the same way. The first and the second belt-rings leave the disk. At the same time, the resilient element located between the two no longer exerts the force on the disk, and therefore the transmission force loss is less and the space above the disk is empty so that the disk is handed over to the axial motor to complete the disk loading.

When the disk is ejected, the disk tray starts to move the slider and the gripper structure towards outside of the base. The force of the groove end on the first gripper disappears, and at the same time causes the second gripper to rotate downward so that the first and second belt-rings move downward to touch the disk. At this time, the resilient element exerts a force on both again so that the disk is firmly held between the rack and the first and second belt-rings, and is steadily ejected to the outside of the base to finish the ejection process.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
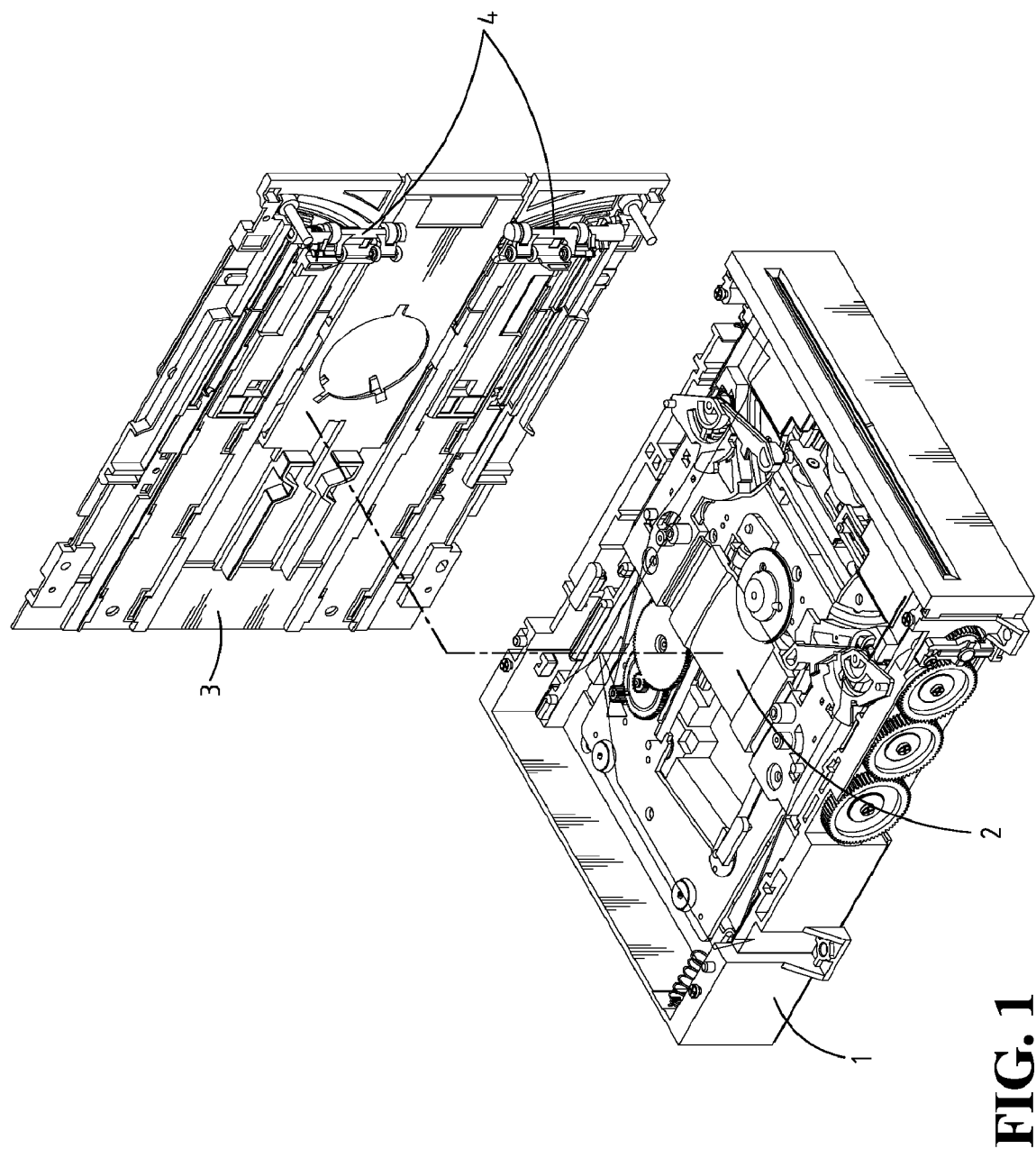
FIG. 1 shows a schematic view of an apparatus for clamping both large and small disks according to the invention.

FIG. 1 shows a schematic view of an apparatus for clamping both large and small disks of the present invention, including a base 1, a disk tray 2, an upper case 3, and two clamping mechanisms 4. Disk tray 2 is able to move back and forth inside base 1, and is for loading and ejecting a disk (not shown). Upper case 3 is located at the upper part of base 1 and disk tray 2. Two clamping mechanisms 4 are located on the two sides of upper case 3, and above base 1 and disk tray 2 but beneath upper case 3. Clamping mechanisms 4 and disk tray 2 cooperate to perform disk loading.

Figure 2A:
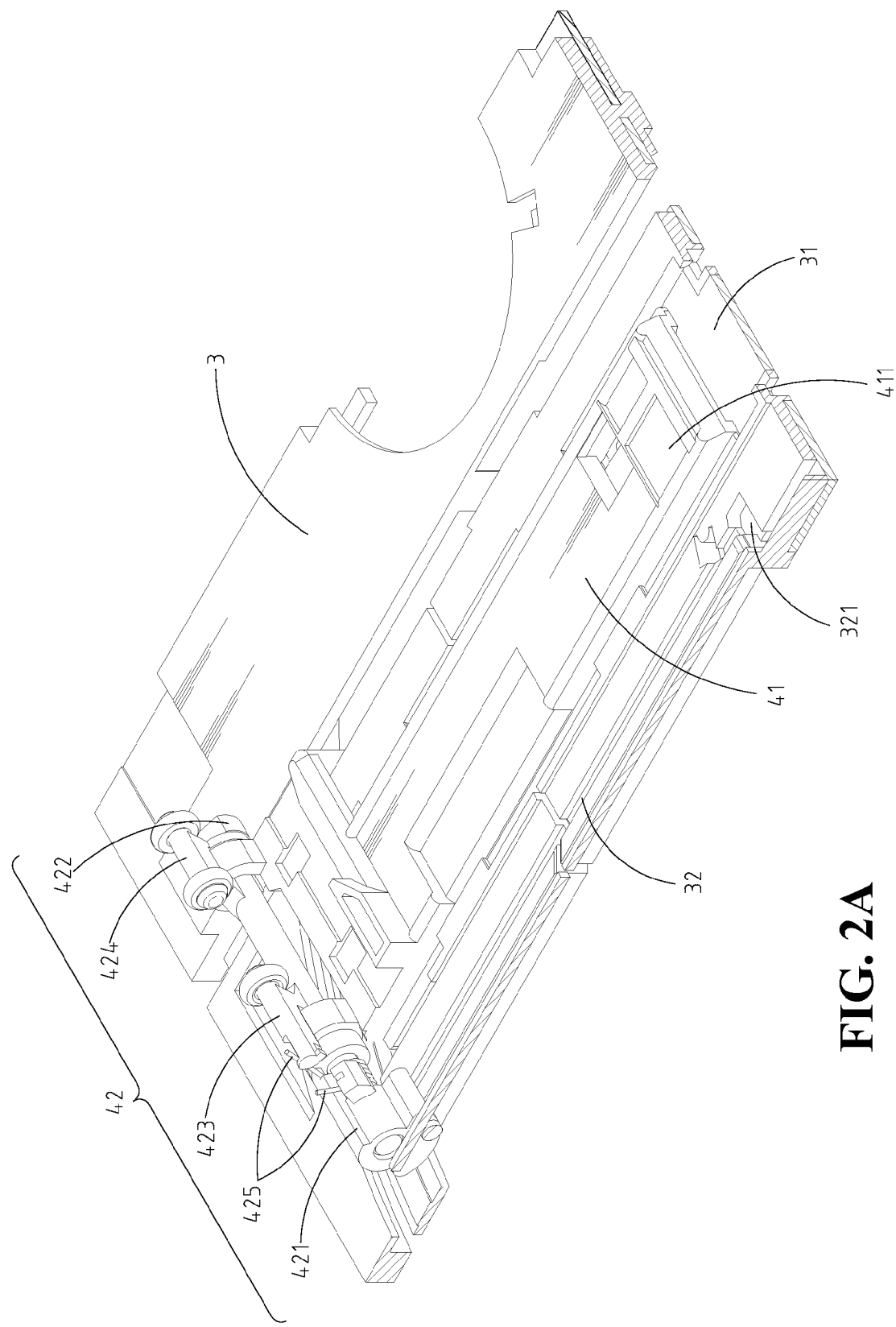
FIG. 2A shows a schematic view of the upper case and the gripper structure.
Figure 2B:
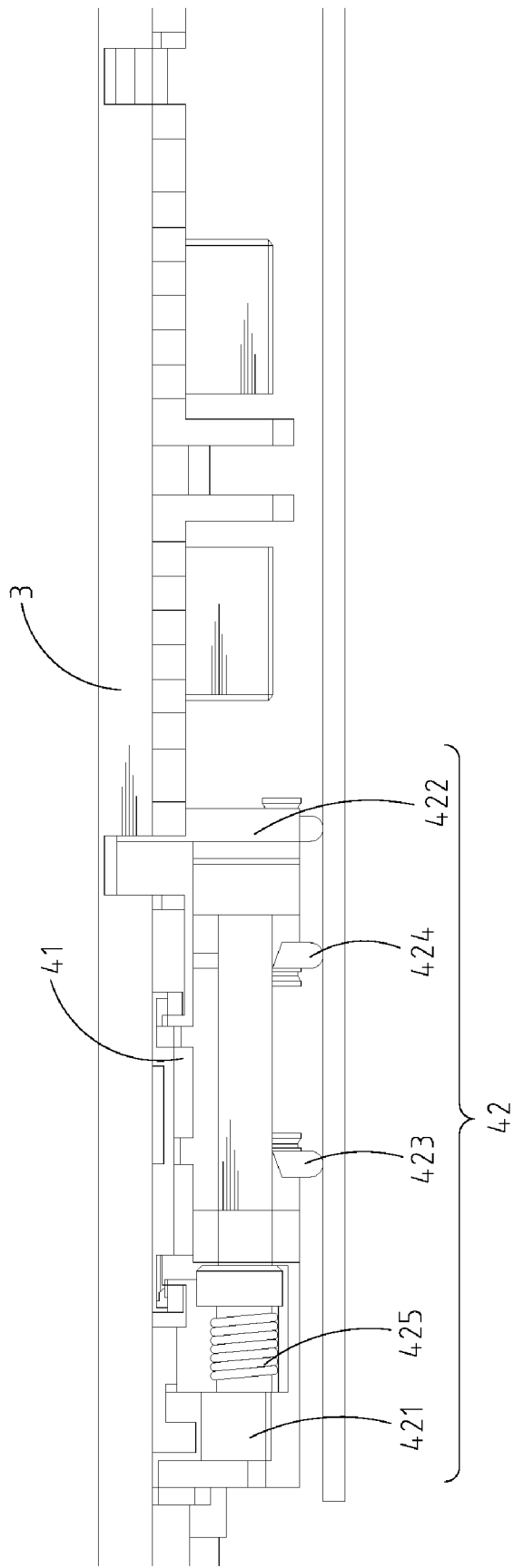
FIG. 2B shows the front view of the upper case and the gripper structure.

Refer to FIGS. 2A & 2B. FIG. 2A shows a schematic view of the upper case and the gripper structure, and FIG. 2B shows a front view of the upper case and the clamping mechanisms. Upper case 3 includes two parallel sliding tracks 31 and two grooves 32. Each clamping mechanism 4 includes a slider 41 and a gripper structure 42 connected together. Slider 41 and gripper structure 42 are two linked parts of a moveable element. Slider 41 is located at sliding track 31, and a first disk gripper 421 of gripper structure 42 is located in groove 32. Hence, slider 41 and first gripper 421 operate separately in sliding track 31 and groove 32.

Figure 3:
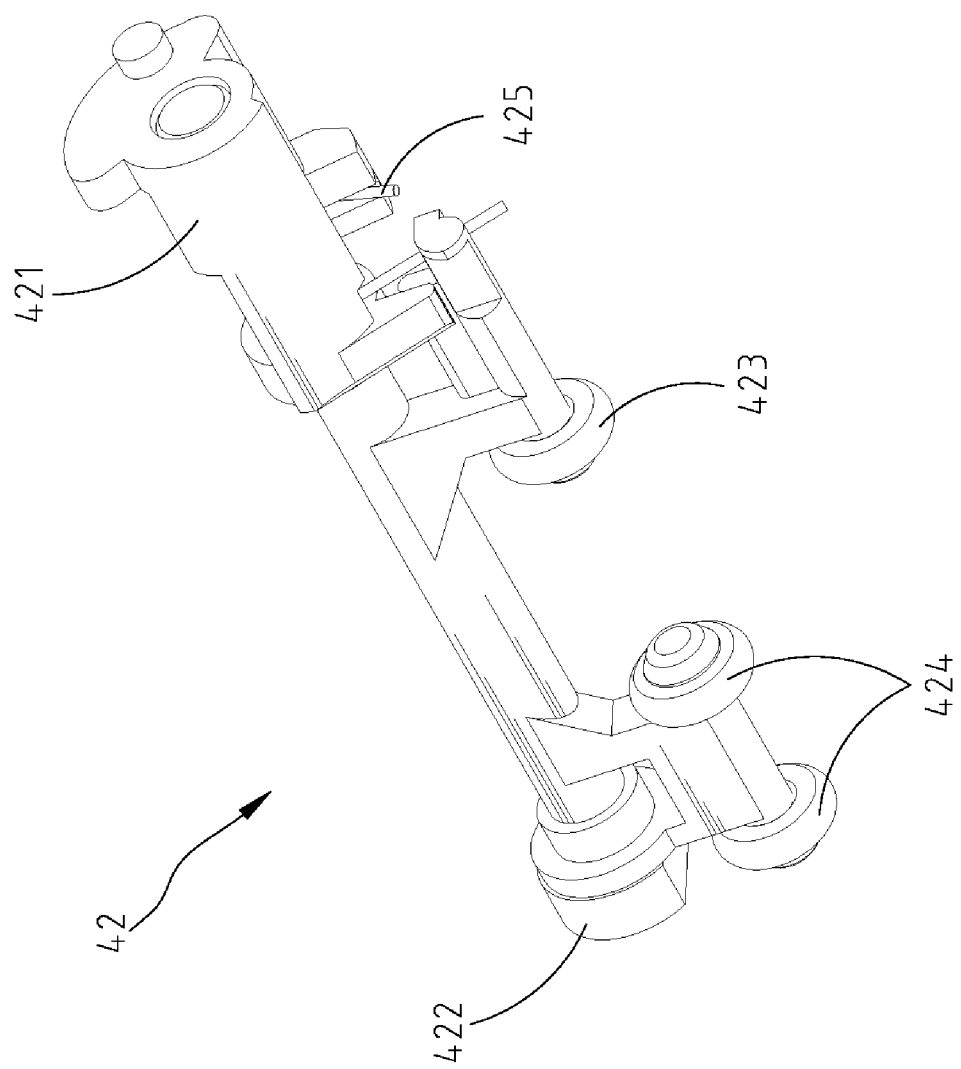
FIG. 3 shows a schematic view of the gripper structure.

FIG. 3 shows a schematic view of gripper structure 42. Gripper structure 42 further includes a first gripper 421, a second gripper 422, a first belt-ring 423, a second belt-ring 424, and a resilient element 425. Resilient element 425 is located between first gripper 421 and second gripper 422, and exerts a force on first gripper 421 and second gripper 422. First belt-ring 423 and second belt-ring 424 are connected to second gripper 422.

Figure 4:
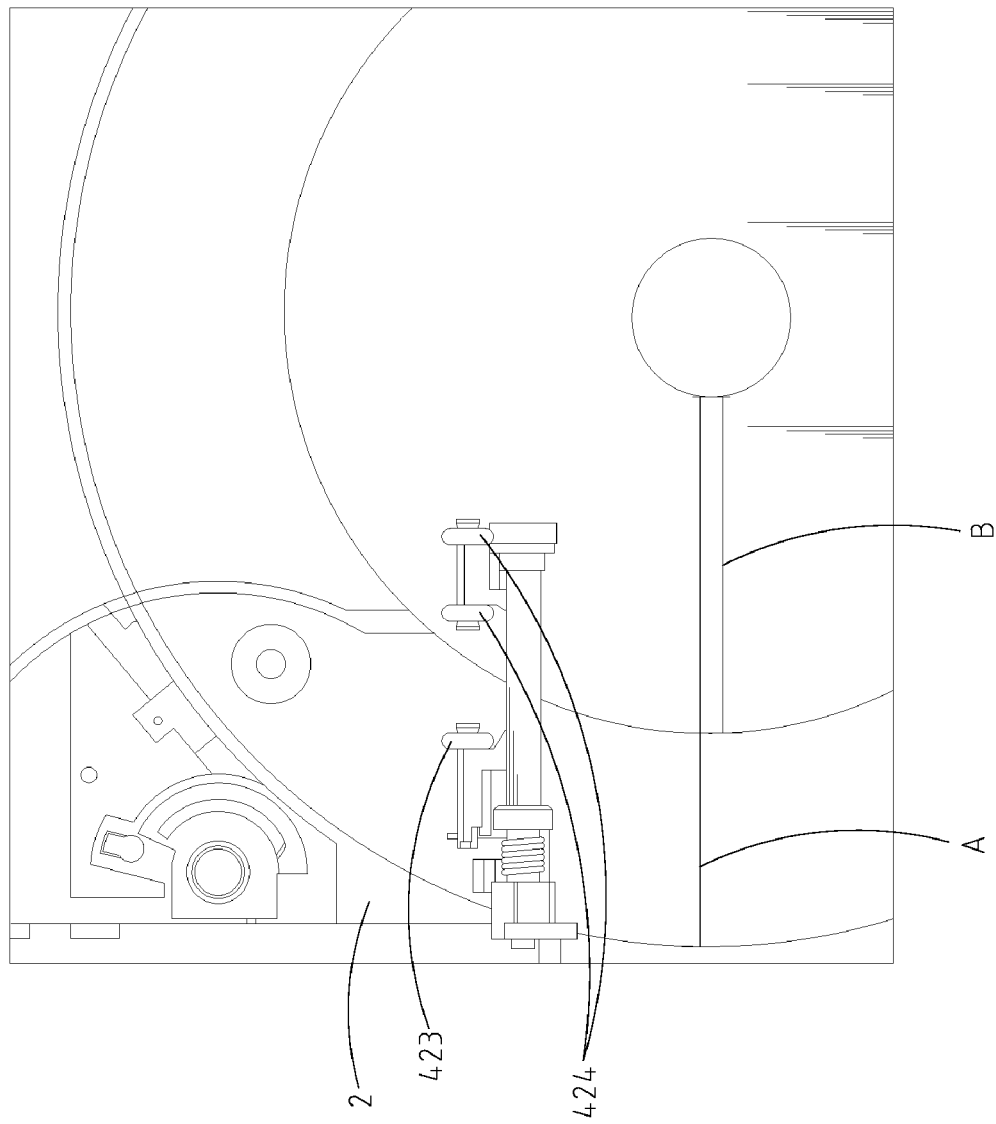
FIG. 4 shows a schematic view of the operation of the first belt-ring and the second belt-ring on the large disk and small disk respectively.

FIG. 4 shows a schematic view illustrating how a large disk or a small disk is clamped between the gripper structure 42 and the disk tray 2. The A in the figure indicates the location of a large disk, and B indicates the location of a small disk. When large disk A is loaded to disk tray 2, first belt-ring 423 and second belt-ring 424 located above large disk A, and a rack 21 beneath large disk A hold large disk A firmly on disk tray 2. When small disk B is loaded onto disk tray 2, only second belt-ring 424 located above small disk B, and rack 21 beneath small disk B hold small disk B firmly on disk tray 2.

First belt-ring 423 and second belt-ring 424 are designed as cylinders and rotatable to enable the loading and ejecting of a disk, while avoiding being damaged by the disk pressure or damaging the disk.

Figure 5:
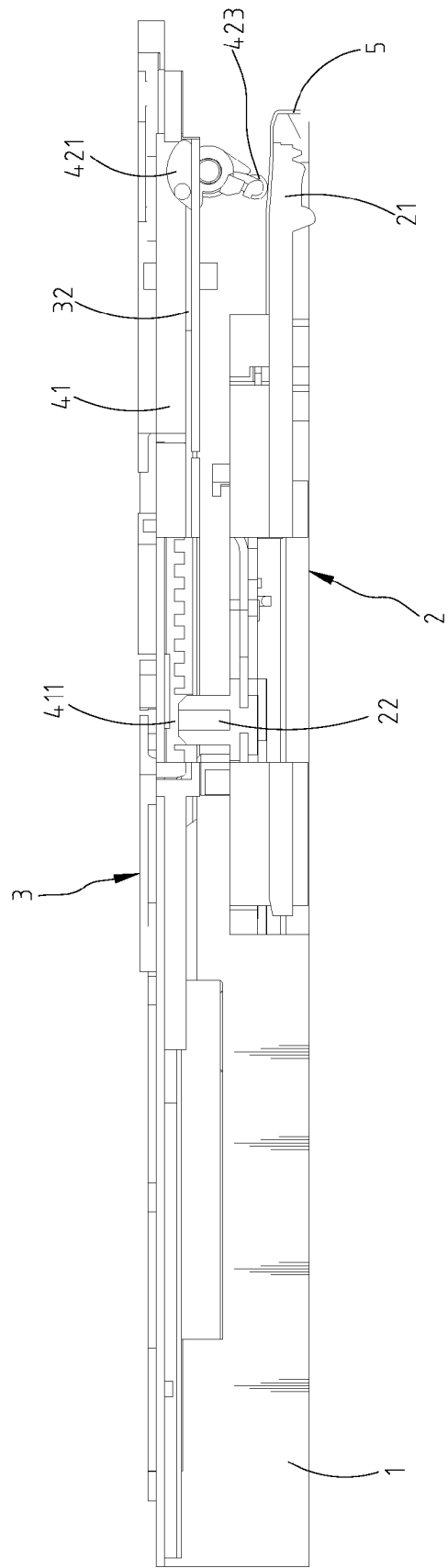
FIG. 5 shows a schematic view of the clamping mechanism in the apparatus without a loaded disk.

FIG. 5 shows a schematic view of the clamping mechanism in the apparatus without a loaded disk. Disk tray 2 is located at the front part of base 1, with a latch 22 of the upper part located at the position of latch hole 411 of slider 41. Upper case 3 is located at the topmost, so that slider 41 will move with disk tray 2. In addition, gripper structure 42 (not shown) is linked to slider 41, so that the movement of disk tray 2 also causes slider 41 and gripper structure 42 to move at the same time. Hence, first gripper 421 of gripper structure 42 (not shown) located at groove 32 of upper case 3 will move inside groove 32. The force exerted by resilient element 425 (not shown) will cause first belt-ring 423 and rack 21 to touch each other to hold a disk (not shown). The surface of rack 21 is covered with a thin sheet 5 of soft material to increase the friction for providing a steady grip and preventing scratching of the disk (not shown).

Figure 6:
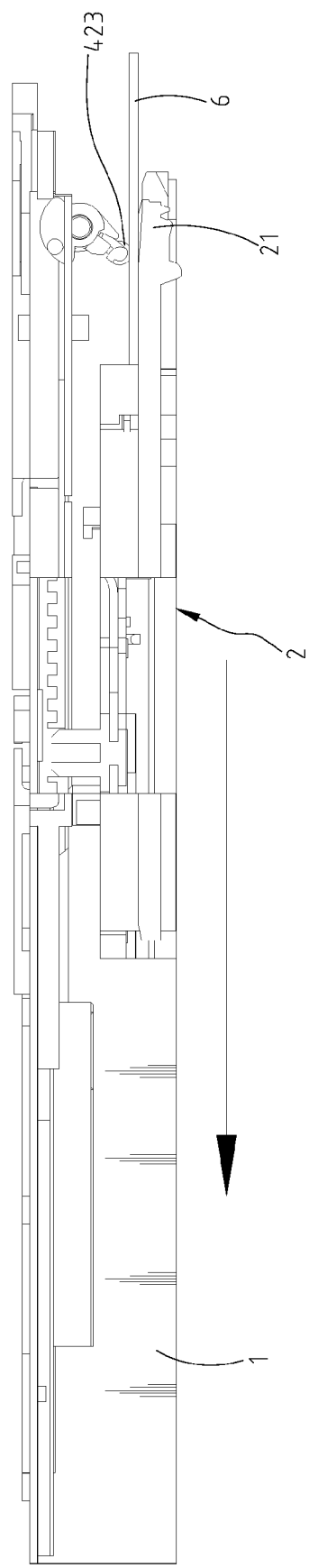
FIG. 6 shows a first schematic view of the operation relation between the first gripper and the groove.
Figure 7:
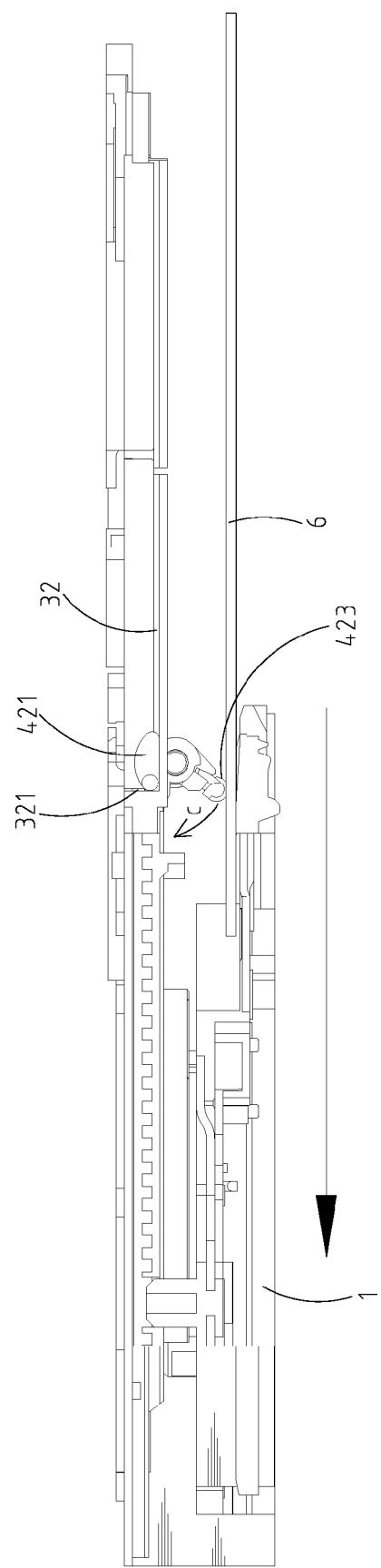
FIG. 7 shows a second schematic view of the operation relation between the first gripper and the groove.
Figure 8:
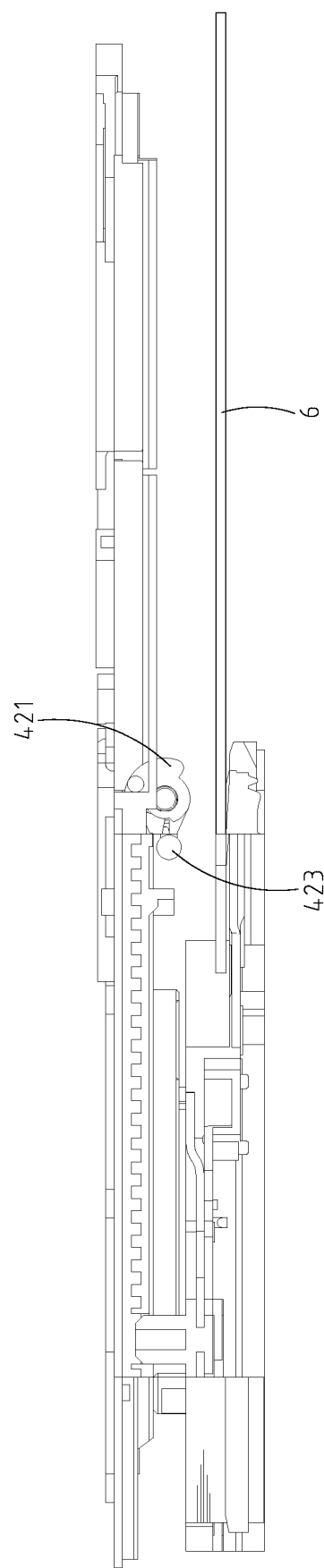
FIG. 8 shows a schematic view of a fully loaded disk.

Refer to FIGS. 6-8. FIGS. 6-8 show a schematic view of the disk loading process. FIG. 6 shows a schematic view of the relation between the first gripper and the groove. Disk 6 is loaded from the front of disk tray 2 to between rack 21 and first belt-ring 423. First belt-ring 423 will make space for disk 6 because the presence of disk 6. Hence, first belt-ring 423 and rack 21 will grip disk 6 in-between for loading, and start to move inward, as shown by the arrow, inside base 1.

FIG. 7 shows a second view of the relation between the action between the first gripper and the groove. When disk tray 2 moves inwards inside base 1, the movement causes the action of first gripper 421 inside groove 32. When first gripper 421 reaches end 321 of groove 32, because of the horizontal stop for first gripper 421 formed by end 321, first gripper 421 and first belt-ring 423 rotate along the C direction, and cause second gripper 422 and second belt-ring (shown in FIG. 2) to rotate along C direction at the same time. At this point, the force of resilient element 425 (not shown) disappears to reduce the system load.

FIG. 8 shows a schematic view of the fully loaded disk. When first gripper 421, first belt-ring 423, second gripper 422 and second belt-ring 424 (shown in FIG. 2), rotate simultaneously so that the space above disk 6 opens up and disk 6 is released, the axial motor (not shown) takes over disk 6 and completes the loading process.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for clamping both large and small disks, comprising:
   a base;
   a disk tray located inside said base, said disk tray having a latch on an upper part and a rack on a front end;
   an upper case located above said base and said disk tray, said upper case having two grooves and two sliding tracks; and
   two clamping mechanisms located between said upper case and said disk tray, each of said two clamping mechanisms further comprising a gripper structure and a slider, said gripper structure having a first gripper, a second gripper, a first belt-ring, a second belt-ring and a resilient element located between said first and second belt-rings, and said slider moving inside the sliding tracks and having a latch hole for receiving said latch of said disk tray;
   wherein said two clamping mechanisms clamp a disk between said gripper structure and said disk tray with a force exerted by said resilient element, said disk tray causes said two clamping mechanisms to move inward into said base, and when said first gripper reaches an end of the grooves, said first gripper rotates upwards to cause said second gripper to rotate upwards, said first and second grippers move away from the disk, and said resilient element stops exerting said force.

2. The apparatus as claimed in claim 1, wherein said first belt-ring and said second belt-ring are rotatable and designed as a cylinder.

3. The apparatus as claimed in claim 1, wherein both said first belt-ring and said second belt-ring exert force on a large disk when said large disk is loaded.

4. The apparatus as claimed in claim 1, wherein only said second belt-ring exerts force on a small disk when said small disk is loaded.

5. The apparatus as claimed in claim 1, wherein said rack is covered with a thin sheet of soft material.

6. The apparatus as claimed in claim 1, wherein said resilient element is a spring.

* * * * *

UNITED STATES PATENT AND TRADEMARK OFFICE
CERTIFICATE OF CORRECTION

| | | |
|---|---|---|
| PATENT NO. | : 7,987,476 B2 | Page 1 of 1 |
| APPLICATION NO. | : 12/186519 | |
| DATED | : July 26, 2011 | |
| INVENTOR(S) | : Chin-Sung Liu et al. | |

It is certified that error appears in the above-identified patent and that said Letters Patent is hereby corrected as shown below:

On the Title Page, Item (73)

Name of the Assignee: change "Industrial Technology Research Institute" to --TopRay Technologies, Inc.--

Signed and Sealed this
Eleventh Day of October, 2011

David J. Kappos
*Director of the United States Patent and Trademark Office*